United States Patent [19]

Miura et al.

[11] Patent Number: 4,693,116
[45] Date of Patent: Sep. 15, 1987

[54] SEMICONDUCTOR-CHIP GAS-FLOW MEASURING APPARATUS

[75] Inventors: Kazuhiko Miura, Aichi; Tadashi Hattori; Yukio Iwasaki, both of Okazaki; Tokio Kohama, Nishio; Kenji Kanehara, Aichi, all of Japan

[73] Assignee: Nippon Soken, Inc., Nishio, Japan

[21] Appl. No.: 802,616

[22] Filed: Nov. 27, 1985

Related U.S. Application Data

[63] Continuation of Ser. No. 621,628, Jun. 18, 1984, abandoned.

[30] Foreign Application Priority Data

Jun. 20, 1983 [JP] Japan ............................. 58-110399

[51] Int. Cl.$^4$ .............................................. G01F 1/68
[52] U.S. Cl. .................................................. 73/204
[58] Field of Search ............. 73/204; 174/52 F, 52 P; 374/178

[56] References Cited

U.S. PATENT DOCUMENTS

| | | | |
|---|---|---|---|
| 2,724,271 | 11/1955 | Shawhan et al. | 73/204 |
| 3,374,673 | 3/1968 | Trageser | 73/204 |
| 3,438,258 | 4/1969 | Seeley | 73/204 |
| 3,680,377 | 8/1972 | Lightner | 73/204 |
| 3,881,181 | 4/1975 | Khajezadeh | 374/178 |
| 3,992,940 | 11/1976 | Platzer | 73/204 |
| 3,996,799 | 12/1976 | van Putten | 73/204 |
| 4,074,566 | 2/1978 | Obayashi et al. | 73/204 X |
| 4,320,655 | 3/1982 | Kammermaier | 73/204 |
| 4,399,698 | 8/1983 | Hiromasa et al. | 73/204 |
| 4,471,647 | 9/1984 | Jerman et al. | 73/23.1 X |
| 4,501,144 | 2/1985 | Higashi et al. | 73/204 |

OTHER PUBLICATIONS

Huijsing et al., "Monolithic Integrated Direction-Sensitive Flow Sensor", in IEEE Transactions on Electron Devices", Ed. 29, #1, Jun. 82, pp. 133-136.
Malin et al., "Mass Flow Meter", IBM Technical Disclosure Bulletin, vol. 21, #78, Jun. 79, p. 3227.
Van Riet et al, "Integrated Direction-Sensitive Flowmeter", in Electronics Letters, 11/25/76, vol. 12, #24, pp. 647 & 648.

Primary Examiner—Herbert Goldstein
Attorney, Agent, or Firm—Cushman, Darby & Cushman

[57] ABSTRACT

A gas-flow measuring apparatus including a semiconductor chip and a sensing circuit. The semiconductor chip includes an electric heater and two temperature-detecting elements. One of the temperature-detecting elements is located closer to the heater than the other. The sensing circuit generates voltage in response to the flow rate of gas flowing through a gas passage.

16 Claims, 14 Drawing Figures

SEMICONDUCTOR-CHIP GAS-FLOW MEASURING APPARATUS

This is a continuation of application Ser. No. 621,628 filed June 18, 1984 which was abandoned upon the filing hereof.

BACKGROUND OF THE INVENTION

1. Field of the Invention

The present invention relates to a gas-flow measuring apparatus which is, used, for example, for measuring the flow rate of engine intake air.

2. Description of the Prior Art

Generally, in an internal combustion engine, the amount of intake air is one of the most important driving parameters for controlling the base fuel injection amount, base ignition timing, and the like. A gas-flow measuring apparatus, i.e., an airflow meter, is provided for this purpose. One of the more common prior art airflow meters is the hot-wire type. For example, the hot-wire-type airflow meter may consist of an electric heater provided in an intake-air passage of an engine, and temperature-dependent resistors arranged before and after the electric heater, the electric heater and the temperature-dependent resistors being made of plantinum wires of the same characteristics. In this type of airflow meter, however, the hot-wires are easily broken due to vibration, shock, and the like.

Another airflow meter more resistant to vibration, shock, and the like uses resistance patterns formed on an insulator such as a ceramic substrate. In this case, the resistance patterns are formed by printing. There are, however, limits as to the fineness of resistance patterns obtainable by printing, therefore it is impossible to reduce the size of the patterns beyond a certain point. This airflow meter is consequently somewhat large and has a large heat capacity, thereby reducing the response characteristics.

SUMMARY OF THE INVENTION

It is an object of the present invention to provide a gas-flow measuring apparatus having good resistance to vibration, shock, and the like and having improved response characteristics.

According to the present invention, a semiconductor chip is mounted within a gas passage. Formed in the semiconductor chip are an electric heater and two temperature-detecting elements. One of the temperature-detecting elements is located closer to the heater than the other. Connected to the heater and the two temperature-detecting elements is a sensing circuit for generating voltage in response to the flow rate of gas flowing through the gas passage.

Since the apparatus of the present invention uses no-hot-wires, high resistance to vibration, shock, and the like can be obtained. In addition, since the photolithography technology can be used in manufacturing the apparatus of the present invention, a fine structure can be obtained, thereby reducing the size and improving the response characteristics.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
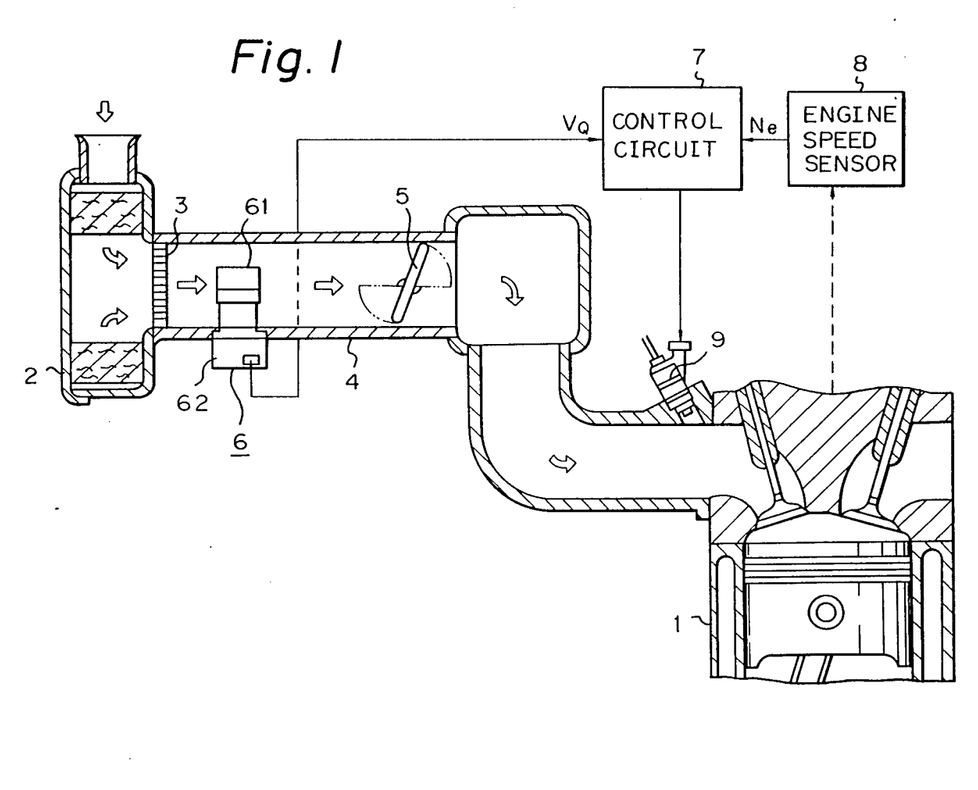
FIG. 1 is a schematic diagram of the overall configuration of an internal combustion engine including a gas-flow measuring apparatus according to the present invention.

In FIG. 1, which illustrates the overall configuration of an internal combustion engine including a gas-flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The gas-flow measuring apparatus is provided in the intake air passage 4 between the rectifier grid 3 and the throttle valve 5 and bears the reference numeral 6.

The gas-flow measuring apparatus 6 is comprised of a sensing portion 61 inside of the intake air passage 4 and a sensing circuit 62 outside of the intake-air passage 4. An output voltage $V_Q$ of the sensing circuit 62 is supplied to a control circuit 7 which is conprised of, for example, a nicrocomputer. The control circuit 7 also receives various kinds of detection signals such as an engine speed signal $N_e$ from an engine speed sensor 8. The engine speed sensor 8 is mounted on a distributor or a camshaft (not shown). Based upon the signals $V_Q$ and $N_e$, the control circuit 7 controls the valve opening time of a fuel injection valve 9.

Figure 2:
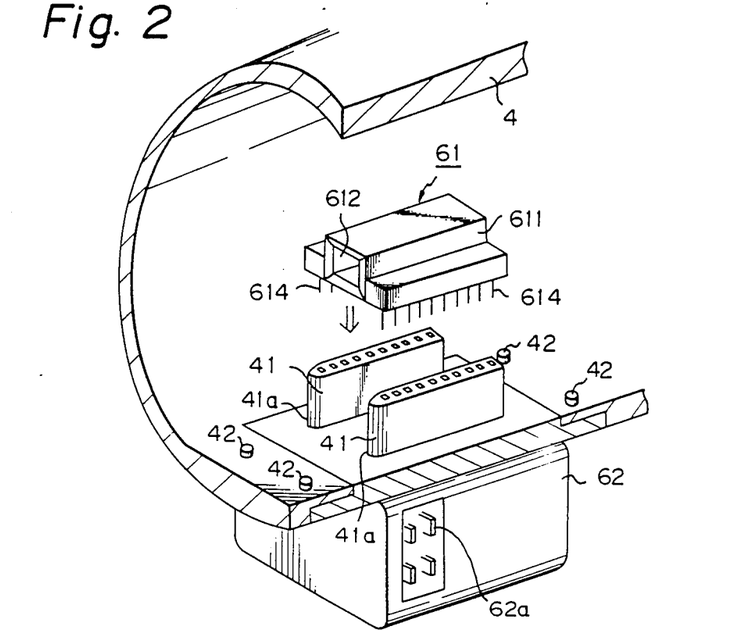
FIG. 2 is a partially cut-away, perspective view of the gas-flow measuring apparatus of FIG. 1.

Referring to FIG. 2, the sensing portion 61 comprises a casing 611 of a dual-in line package type in which an air passage 612 is formed. The air passage 612 is in parallel to the air stream of the intake air passage 4. Mounted at the center of the air passage 611 is a semiconductor chip 613 (see FIG. 3). The casing 611 has two parallel rows of lead pins 614. The casing 611 is fixed to sockets 41 by inserting the lead pins 614 into corresponding mating holes. Adhesives are applied to the lead pins 614 before insertion. The plate bearing the sockets 41 is then fixed by screws 42 to the intake air passage.4. The sensing circuit 62 is fixed to the other side of the plate bearing sockets 41. The sensing circuit 62 processes the signals output from the sensing portion 61 and generates the analog voltage $V_Q$ from connectors 62a.

The sockets 41 protrude from the inner wall of the intake-air passage 4. Accordingly, the sensing portion 61 is positioned away from the so-called "boundary layer" of air, i.e., the layer of non-flow air near the inner wall of the intake air passage 4. In addition, the edges 41a of the sockets 41 on the upstream side are sharp as to minimize fluctuation in the flow rate of air.

Figure 3:
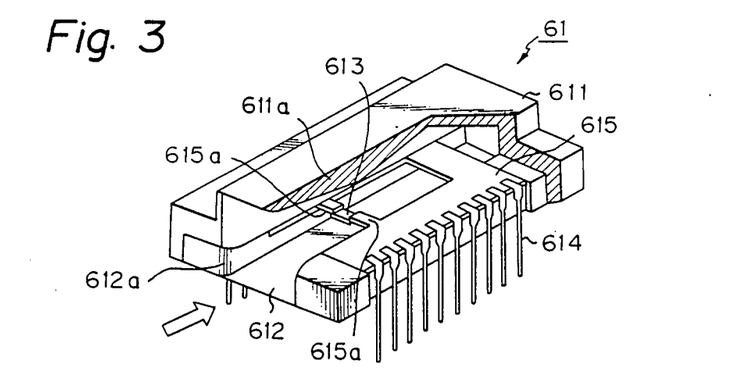
FIG. 3 is a partially cut-away, perspective view of the sensing portion of FIG. 2.

The sensing portion 61 will be explained in more detail with reference to FIG. 3. In FIG. 3, reference numeral 615 designates a ceramic board having conductor paste printed thereon for electrically connecting the semiconductor chip 613 to the lead pins 614. The semiconductor chip 613 and the lead pins 614 are soldered to the ceramic board 615 by the flip-chip-bump method. In this case, the semiconductor chip 613 is fixed to two protrusions 615a of the ceramic board 615 so as to expose the semiconductor chip 613 to the stream of air. The width of each of the protrusions 615a is about the same as that of the semiconductor chip 613, as illustrated in FIG. 3. As a result, the heat dissipation of the semiconductor chip 613 to the ceramic board 615 is reduced, thereby reducing the power dissipation of the apparatus.

An inlet portion 612a of the air passage 612 is bell-mouthed to minimize fluctuation of the air stream leading to the air passage 612.

The inner wall of the casing 611 protrudes inward in the vicinity of the semiconductor chip 613 to avoid stagnation of the air stream. That is, the cross-sectional area of the passage of the casing 611 in the vicinity of the semiconductor chip 613 is reduced, thereby obtaining a high accuracy of measuring the flow rate.

Note that, when a diffused junction transistor or a diffused junction diode is formed in a semiconductor substrate, the conductivity of the transistor or diode changes along with temperature. For example, the transistor or diode will have a linear characteristic of forward voltage to temperature of 2.0 to 2.5 mV/° C. When a diffused resistor is formed in a semiconductor chip, its resistance also changes along with temperature. Therefore, a diffused junction transistor, diffused junction diode, diffused resistor, or other such element can serve as the temperature-detecting element.

Figure 4A:
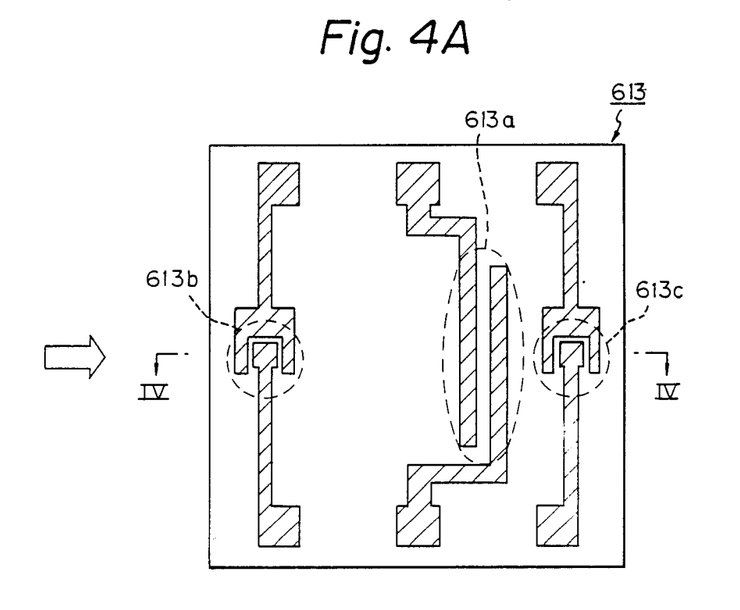
FIG. 4A is a plan view of the semiconductor chip of FIG. 3.

The semiconductor chip 613 of FIG. 3 will be explained with reference to FIGS. 4A and 4B. In FIG. 4A, shaded portions indicate metal electrodes such as aluminum electrodes. Reference 613a designates an electric heater formed by a diffused resistor, 613b a first temperature-detecting element formed by a diffused junction diode, and 613c a second temperature-detecting element formed by a diffused junction diode. The first temperature-detecting element 613b is located on the upstream side of the heater 613a and apart therefrom, while the second temperature-detecting element 613c is located on the downstream side of the heater 613a. The second temperature-detecting element 613c is located closer to the heater 613a than the first temperature-detecting element 613b.

Figure 4B:
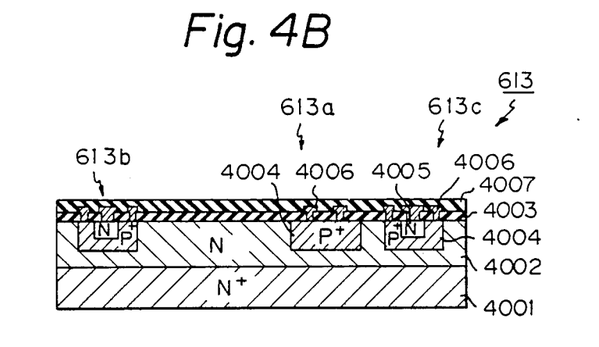
FIG. 4B is a cross-sectional view taken along line IV—IV of FIG. 4A.

Referring to FIG. 4B, which is a cross-sectional view of FIG. 4A, an N-type epitaxial layer 4002 is grown on an N+-type monocrystalline silicon substrate 4001. An insulating layer such as $SiO_2$ is grown or deposited thereon, and the insulating layer is patterned. After that, P-type ions such as boron ions are doped thereinto, so as to obtain a P+-type region 4004. The insulating layer 4003 is etched, and another insulating layer 4003 is again grown or deposited and patterned. N-type ions such as arsenic ions or phosphorus ions are doped thereinto, so as to obtain an N-type region 4005. The insulating layer 4003 is patterned, and an aluminum pattern 4006 is formed thereon. Finally, passivation layer 4007 such as a $SiO_2$, SiC, or $Si_3N_4$ is formed. Thus, the heater 613a, and, the first and second temperature-detecting elements 613b and 613c are obtained.

In the configuration as illustrated in FIGS. 4A and 4B, when power is supplied to the heater 613a, heat generated in the heater 613a is transferred through the semiconductor chip 613 and the air flowing through the air passage 612 of FIG. 3 to the exterior. In this case, however, since the second temperature-detecting element 613c is closer to the heater 613a than the first temperature-detecting element 613b, the capacity of heat transfer to the first temperature-detecting element 613b is very different from that to the second temperature-detecting element 613c, via the interior of the semiconductor chip 613 as well as the air stream.

Figure 5:
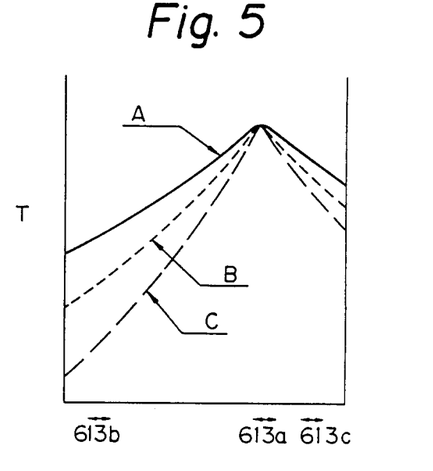
FIGS. 5 and 6 are graphs showing the operation of the semiconductor chip of FIG. 4A.

In FIG. 5, which illustrates the temperature characteristics of the semiconductor chip 613 of FIGS. 4A and 4B, the abscissa indicates the locations of the heater 613a and the temperature-detecting elements 613b and 613c, while the ordinate indicates the temperature. Here, curve A shows the case where the flow rate of air is zero, curve B shows the case where the flow rate of air is 20 g/s, and the curve C shows the case where the flow rate of air is 50 g/s. As understood from FIG. 5, there is a relatively large difference in temperature between the first and second temperature-detecting elements 613b and 613c.

Figure 6:
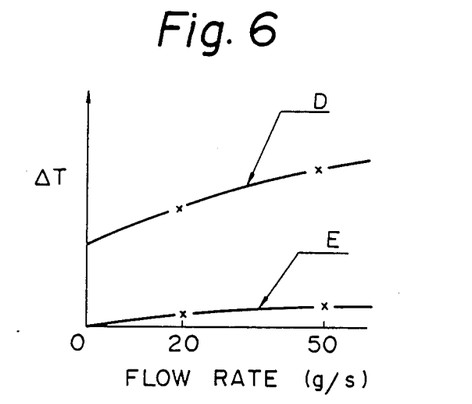

In FIG. 6, which illustrates the differnce ΔT in temperature between the first and second temperature-detecting elements 613b and 613c in relation to the flow rate of air, curve D shows the case where the second temperature-detecting element 613c is closer to the heater 613a than the first temperature-detecting element 613b, while curve E shows the case where the first temperature-detecting element 613b is the same distance from the heater 613a as the second temperature-detecting element 613c.

Figure 7A:
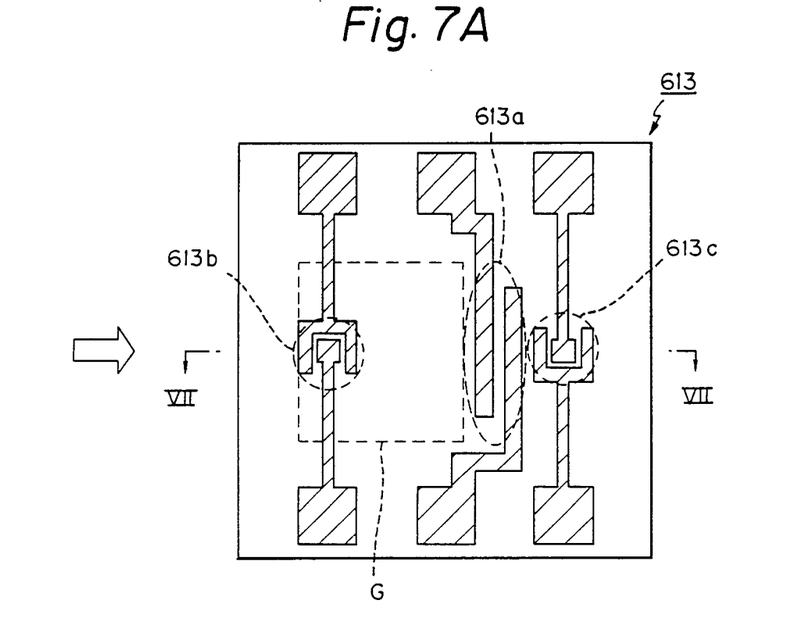
FIG. 7A is a plan view of a modification of the semiconductor chip of FIG. 4A.
Figure 7B:
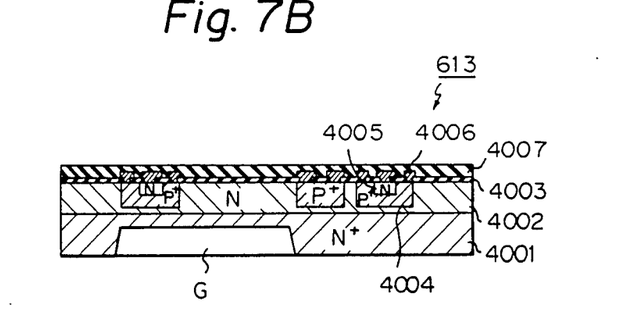
FIG. 7B is a cross-sectional view taken along line VII—VII of FIG. 7A.

The above-mentioned large difference in temperature between the first and second temperature-detecting elements 613b and 613c enables a high accuracy of measurement of the flow rate of air. A plan view of a modification of the semiconductor chip of FIG. 4A is given in FIG. 7A. A cross-sectional view of FIG. 7A is given in FIG. 7B. Referring to FIGS. 7A and 7B, the back of the semiconductor chip 613 is etched so as to create a recess G, thereby further increasing the difference in temperature between the first and second temperature-detecting elements 613b and 613c. For example, if the semiconductor chip 613 is 300 μm thick, the back thereof may be etched about 50 μm. In addition, since the heat capacity of the semiconductor chip 613 is reduced due to the presence of the recess G, the response speed of the apparatus can be improved.

Figure 8A:
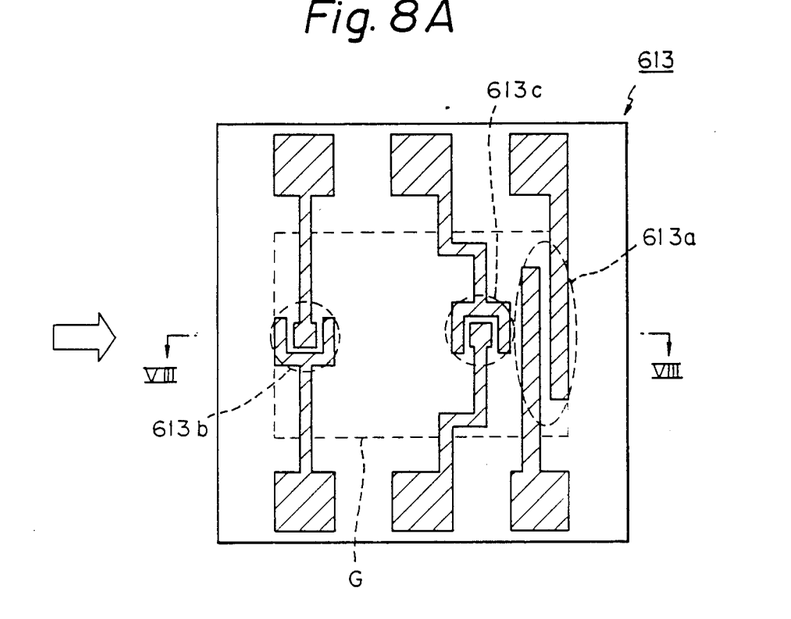
FIG. 8A is a plan view of another modification of the semiconductor chip of FIG. 4A.
Figure 8B:
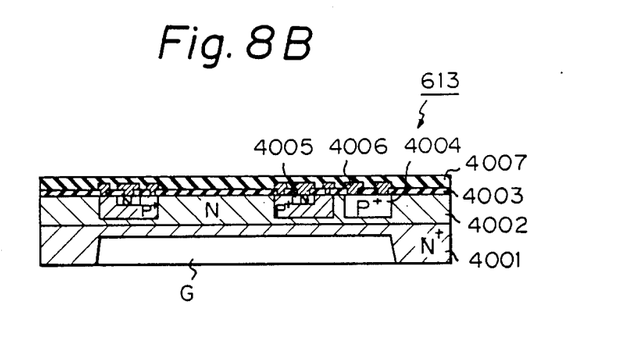
FIG. 8B is a cross-sectional view taken along line VIII—VIII of FIG. 8A.

Another modification of the semiconductor chip of FIG. 4A is given in FIG. 8A. A cross-sectional view of FIG. 8A is given in FIG. 8B. Referring to FIGS. 8A and 8B, the first temperature-detecting element 613b, the second temperature-detecting element 613c, and the heater 613a are arranged, in that order, along the air stream. Note that, even in this case, the second temperature-detecting element 613c is closer to the heater 613a than the first temperature-detecting element 613b. In this modification, the back of the semiconductor chip 613 is also etched so as to create a recess G.

Figure 9A:
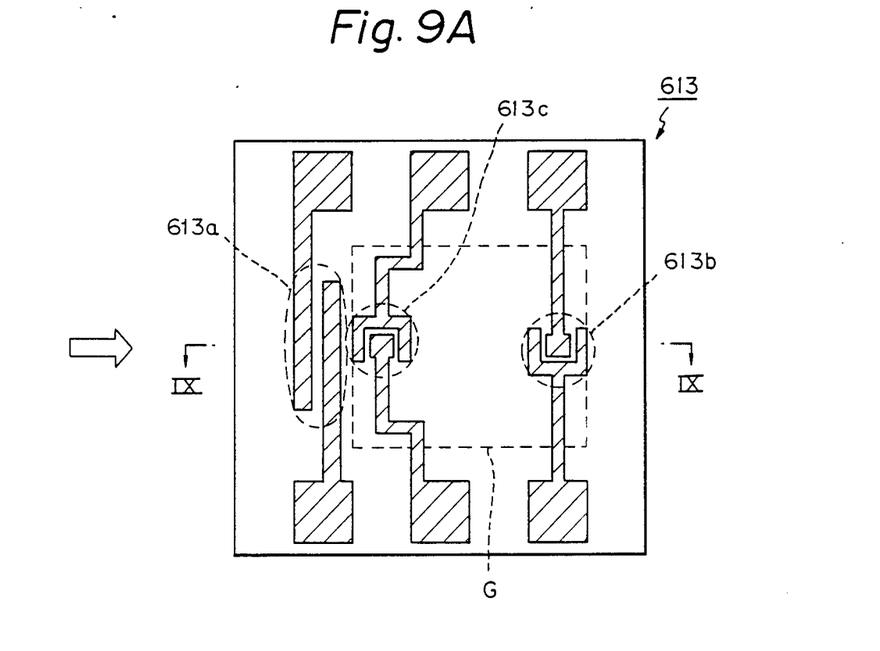
FIG. 9A is a plan view of a further modification of the semiconductor chip of FIG. 4A.
Figure 9B:
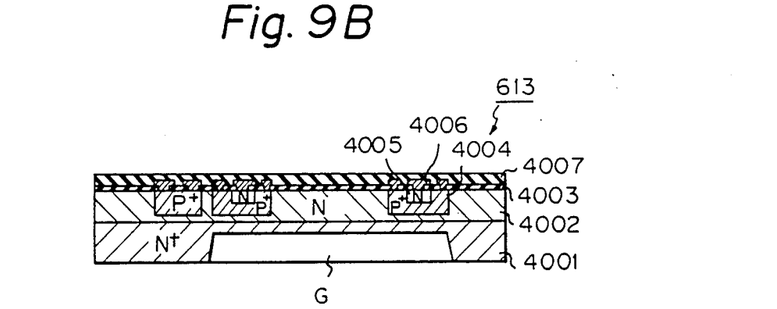
FIG. 9B is a cross-sectional view taken along line IX—IX of FIG. 9A.

Still another modification of the semiconductor chip of FIG. 4A is given in FIG. 9A. A cross-sectional view of FIG. 9A is given in FIG. 9B. Referring to FIGS. 9A and 9B, the heater 613a, the second temperature-detecting element 613c, and the first temperature detecting element 613b are arranged, in that order, along the air stream. Note that, even in this case, the second temperature-detecting element 613c is closer to the heater 613a than the first temperature-detecting element 613b. In this modification too, the back of the semiconductor chip 613 is etched so as to create a recess G.

Figure 10:
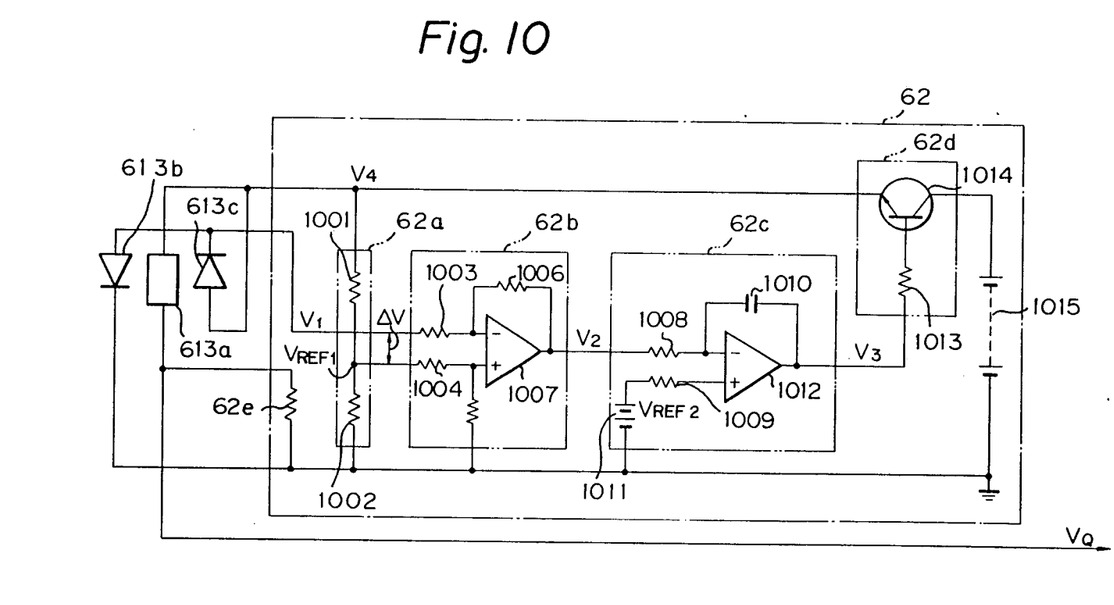
FIG. 10 is a circuit diagram of the sensing circuit of FIG. 2.

Referring now to FIG. 10, the sensing circuit 62 includes a circuit 62a for generating a reference voltage $V_{REF1}$, a first differential amplifier 62b, a second differential amplifier 62c, a power amplifier 62d, and an output resistor 62e.

The reference voltage-generating circuit 62a comprises two resistors 1001 and 1002 in series which, together with the temperature-detecting elements 613b and 613c, constitute a bridge circuit.

The first differential amplifier 62b includes input resistors 1003 and 1004, a ground resistor 1005, a negative feedback resistor 1006, and an operational amplifier 1007. The first differential amplifier 10b amplifies the difference $\Delta V_1 (=V_{REF1}-V_1)$ in potential between the diagonal points of the bridge circuit and generates an output voltage $V_2$.

The second differential amplifier 62c comprises input resistor 1008 and 1009, a capacitor 1010, a reference voltage source 1011 for generating a reference voltage $V_{REF2}$, and an operational amplifer 1012. The second differential amplifier 62c amplifies the difference in potential between the output voltage $V_2$ of the first differential amplifier 62b and the reference voltage $V_{REF2}$ of the reference voltage source 1011 and generates an output voltage $V_3$. The capacitor 1010 serves to prevent oscillation of the amplifier 62c.

The power amplifier 62d comprises a resistor 1013 and a power transistor 1014 which is supplied with power by a battery 1015. The power amplifier 62d amplifies the output voltage $V_3$ of the second differential amplifier 62c and supplies an output voltage $V_4$ to the bridge circuit and to the electric heater 613a.

The output resistor 62e is used to supply the voltage $V_Q$ indicating the amount of air flowing through the air-intake passage 4 (FIG. 1).

The operation of the sensing circuit 62 will now be explained. The voltage $V_4$ applied to the electric heater 613a and the bridge circuit formed by the temperature-detecting elements 613b and 613c, and resistors 1001, and 1002 is controlled by the differential amplifiers 62b and 62c and the power amplifier 62d so that the voltage $\Delta V_1$ is held constant. In this case, the amount of air flow G is expressed by $$G=\{K_1/(C_p \cdot V_1)\} \cdot I^n \quad (1)$$

where
$K_1$ is a constant;
$C_p$ is the specific heat at a constant pressure of the air;
I is the current flowing through the electric heater 613a; and
n is a constant which equals a value of from 2 to 3. In additon, the specific heat $C_p$ is dependent upon the temperature THA of the air, which is detected by an intake-air temperature sensor (nor shown). That is, $$C_p = f(THA) \quad (2)$$

Further, since the voltage $V_Q$ is proportional to the current I, the equation (1) can be replaced by $$G = K_2 f(THA) \cdot V_Q^n \quad (3)$$

where $K_2$ is a constant.

Thus, the amount of air flow can be calculated in accordance with equation (3). The calculation of equation (3) can be directly carried out at the control circuit 7. Note that, since the value of n in equation (3) is 2 to 3, it is preferable to arrange a linearizing circuit at the output of the sensing circuit 62, thereby obtaining the value of $V_Q^n$.

Thus, the sensing circuit 62 controls the heat generated by the heater 613a so as to hold the difference in temperature between the first and second temperature-detecting elements 613b and 613c, i.e., the difference $\Delta V_1$ in potential, at a definite value, thereby measuring the flow rate of air.

Of course, each of the temperature-detecting elements can also be formed by a diffused junction transistor having a base region connected to a collector region thereof or a diffused resistor. In addition, the heater can be formed by a diffused junction transistor or a diffused junction diode. Note, however, that the use of a diffused junction transistor requires another lead pin as compared with a diffused junction diode or a diffused resistor.

Further, it is possible to etch the entire back of the semiconductor chip rather than just a part thereof.

As explained hereinbefore, according to the present invention, resistance to vibration, shock, and the like can be obtained. In addition, a high response speed can and a high accuracy of measurement can be obtained.

We claim:

1. An apparatus for measuring the flow rate of gas through a passage comprising:
   a semiconductor chip including an electric heater, a first temperature-detecting element, and a second temperature-detecting element located closer to said electric heater than said first temperature-detecting element;
   said semiconductor chip being mounted within said passage so that said electric heater, and said first and second temperature-detecting elements are in line with the direction of the gas stream;
   support means for supporting said semiconductor chip so as to expose both the front and back of said semiconductor chip to the gas stream, thereby suppressing the transfer of heat from said semiconductor chip to said support means, said support means comprising two protrusions having approximately the same width as that of said semiconductor chip, the end portions of said semiconductor chip being fixed to said protrusions; and
   sensing circuit means, connected to said semiconductor chip, for controlling the power supplied to said electric heater so that the difference in temperature between said first and second temperature-detecting elements is definite, thereby generating a voltage corresponding to a flow rate of said gas flowing through said passage.

2. An apparatus for measuring the flow rate of gas through a passage comprising:

a semiconductor chip mounted within said passage, said semiconductor chip including an electric heater, a first temperature-detecting element, and a second temperature-detecting element located closer to said electric heater than said first temperature-detecting element;

sensing circuit means connected to said semiconductor chip for generating a voltage corresponding to a flow rate of said gas flowing through said passage; and a casing of a dual-inline-package type, having a passage parallel to said gas passage and fixed to the inner wall of said gas passage for mounting said semiconductor chip substantially at a central portion thereof.

3. An apparatus as in claim 2 further comprising: socket means, arranged between said casing and the inner wall of said gas passage, for setting said casing away from the inner wall of said gas passage.

4. An apparatus as in claim 3 wherein the edges of said socket means are sharp.

5. An apparatus as in claim 4 wherein the inlet portion of said casing is bellmouthed.

6. An apparatus as in claim 2 wherein the air cross-sectional area of said casing in the vicinity of said semiconductor chip is reduced.

7. An apparatus for measuring the flow rate of gas which is flowing from an upstream to a downstream direction through a gas passage comprising:

a casing of dual in-line package type having an inner passage approximately parallel to said gas passage;

a thin-late sensing chip for detecting the temperature thereof, said chip including a heater element;

support means, provided at the inner wall of said casing, for supporting said sensing chip and for locating said sensing chip at substantially a central portion of said inner passage;

sensing circuit means, connected to said sensing chip, for generating a signal indicative of said flow rate of gas flowing through said gas passage; and socket means, arranged between said casing and the inner wall of said gas passage, for locating said casing away from the inner wall of said gas passage.

8. An apparatus as set forth in claim 7, wherein at least the upstream-side edges of said socket means are sharp.

9. An apparatus for measuring the flow rate of gas which is flowing from an upstream to a downstream direction through a gas passage comprising:

a casing of a dual in-line package type having an inner passage approximately parallel to said gas passage;

a thin-plate sensing chip for detecting the temperature thereof, said chip including a heater element and first and second temperature-detecting elements which are arranged with said heater element in line with the direction of the gas stream wherein said second temperature-detecting element is located closer to said heater element than said first temperature-detecting element;

support means, provided at the inner wall of said casing, for supporting said sensing chip and for locating said sensing chip at substantially a central portion of said inner passage; and sensing circuit means, connected to said sensing chip, for generating a signal indicative of said flow rate of gas flowing through said gas passage.

10. An apparatus as set forth in claim 9, wherein said first temperature-detecting element is located on the upstream side of said heater element and said second temperature detecting element is located on the downstream side of said heater element.

11. An apparatus as set forth in claim 9, wherein said first and second temperature-detecting elements are located on the upstream side of said heater element.

12. An apparatus as set forth in claim 9, wherein said first and second temperature-detecting elements are located on the downstream side of said heater element.

13. An apparatus for measuring the flow rate of a gas which is flowing from an upstream location to a downstream location through a gas passage, comprising:

a dual in-line package socket structure which includes two separate socket structures which are spaced from one another and which have upstream facing edges which are sharp, said two separate socket structures defining a first inner passage therebetween;

a dual in-line package casing, having terminals which are adapted to mate with said dual in-line package socket structure, and which is formed with a second inner passage therewithin, said second inner passage defining an area which has a larger cross-section in an upstream facing inlet portion than a smaller cross-section in at least one other portion thereof;

temperature detecting means, located within said dual in line package casing, for detecting a temperature thereof; and means for supporting said temperature detecting means within said second inner passage at a location of said smaller cross-section.

14. Apparatus as in claim 13 further comprising sensing circuit means, connected to said temperature detecting means, for generating a signal corresponding to a flow rate of gas flowing through said gas passage.

15. Apparatus as in claim 14 wherein an upstream portion of said second inner passage is bellmouthed.

16. Apparatus as in claim 15 wherein said second inner passage protrudes inward in a vicinity of said temperature detecting means to reduce stagnation of the air stream therearound.

* * * * *